United States Patent [19]
Hall

[11] Patent Number: 5,629,807
[45] Date of Patent: May 13, 1997

[54] HELMET MOUNTED IMAGE INTENSIFIER

[75] Inventor: John M. Hall, Alexandria, Va.

[73] Assignee: The United States of America as represented by the Secretary of the Army, Washington, D.C.

[21] Appl. No.: 455,887

[22] Filed: May 31, 1995

[51] Int. Cl.⁶ .................................................. G02B 27/14
[52] U.S. Cl. ........................ 359/630; 359/631; 359/633
[58] Field of Search ..................... 359/629, 630, 359/631, 633, 632; 345/7, 8

[56] References Cited

U.S. PATENT DOCUMENTS

| | | | |
|---|---|---|---|
| 4,000,419 | 12/1976 | Crost | 250/213 VT |
| 4,629,295 | 12/1986 | Vogl | 359/364 |
| 4,653,879 | 3/1987 | Filipovich | 359/351 |
| 4,655,562 | 4/1987 | Kreitzer | 359/351 |
| 4,761,056 | 8/1988 | Evans | 359/631 |
| 4,826,302 | 5/1989 | Afsenius | 313/524 |
| 4,915,487 | 4/1990 | Riddell, III | 359/630 |
| 4,961,626 | 10/1990 | Fournier | 359/630 |
| 5,035,474 | 7/1991 | Moss | 359/13 |
| 5,079,416 | 1/1992 | Filipovich | 250/213 VT |
| 5,084,780 | 1/1992 | Phillips | 359/350 |
| 5,140,151 | 8/1992 | Weiner | 250/213 VT |
| 5,254,852 | 10/1993 | Filipovich | 250/214 VT |
| 5,497,266 | 5/1996 | Owen | 353/353 |

*Primary Examiner*—Georgia Y. Epps
*Assistant Examiner*—Ricky Mack
*Attorney, Agent, or Firm*—Milton W. Lee; John E. Holford; Alain L. Bashore

[57] ABSTRACT

A head-mounted vision enhancement system which provides crash survivability, weight, and center of gravity superior to the currently fielded image intensifier goggle arrangements. This is accomplished by positioning the goggle objective lens assembly and intensifier tube closer in around the head and then using an eyepiece to bring the image back around into the eye. Hypersteropsis is thus avoided by folding the intensifier objective lenses from the center of the forehead.

2 Claims, 3 Drawing Sheets

HELMET MOUNTED IMAGE INTENSIFIER

BACKGROUND OF THE INVENTION

1. Field of the Invention

The present invention generally relates to helmet-mounted night vision enhancement systems and more specifically, to an image intensifier subsystem arrangements for helmet-mounted night vision enhancement systems.

2. Description of Prior Art

The currently fielded Army aviation goggles are the AN/AVS-6 ("ANVIS"), and the AN/PVS-5. They both feature a 40° field of view and low light level image intensification. The intensification is accomplished by employing an objective lens that focuses the outside scenery onto a photocathode tube. The tube then converts the photons to electrons and multiplies the electrons thousands of times. The electrons then strike the rear of the output eyepiece of the tube, where a luminescent phosphor converts the electrons back into photons as an intensified image. A typical phosphor is the green colored P43. The eyepiece lenses focus backwards onto the phosphor screen with the same net focal length as the objective lenses, thereby projecting the image back out to its true location in real space. This provides the user with an intensified, albeit monochromatic, view of the real world.

Head-mounted night vision goggle technology that is currently fielded involves the mounting of the AN/AVS-6 or AN/PVS-5 image intensification goggles on the helmet so they hang directly in front of the user's eyes. This arrangement adds a weight (1.0 pound system weight) and center of gravity moment upon the head that exceeds the U.S. Army Aeromedical Research Lab's recommended crash safety specifications for U.S. Army helicopter pilots. When the intensifier objectives and tubes are arranged at a position back and closer to the ears there is a reduction of the center of gravity moment, but it also increases the left-right separation beyond the normal separation of the human eyes. When the sensor apertures are farther apart than the human eyes, the user perceives an exaggerated sensation of depth perception known as "hyperstereopsis". This condition is proven to be detrimental to helicopter pilot performance when close maneuvering is required.

While the prior art has reported using helmet mounted night vision enhancement devices, none have established a basis for a specific apparatus that is dedicated to the task of resolving the particular problem at hand. What is needed in this instance is a new image intensifier arrangement for a helmet-mounted night vision enhancement system that allows for further correction for center-of-gravity imbalance, and no hyperstereopsis.

SUMMARY OF THE INVENTION

It is therefore one object of the invention to provide a new image intensifier arrangement for a helmet-mounted night vision enhancement system that allows for further correction for center-of-gravity imbalance, and no hyperstereopsis.

According to the invention, for disclosed a helmet-mounted vision enhancement system, each side of the system further including a reflecting means and intensifier means arranged substantially parallel to the user's forehead and facing in toward the user's nose. This arrangement provides a user with a simultaneous view of the environment and an intensified image, acceptable center of gravity, and eliminates hypersteropsis.

The reflecting means reflects the field of view of the outside environment perpendicular to the normal human eye line of sight as a reflected image. In the preferred embodiment this is a fold mirror formed into a 90 degree wedge. The intensifier means focuses and image intensifies the reflected image. The intensifier means in the preferred embodiment is the objective lens assembly and intensifier tube of the AN/AVS-6.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
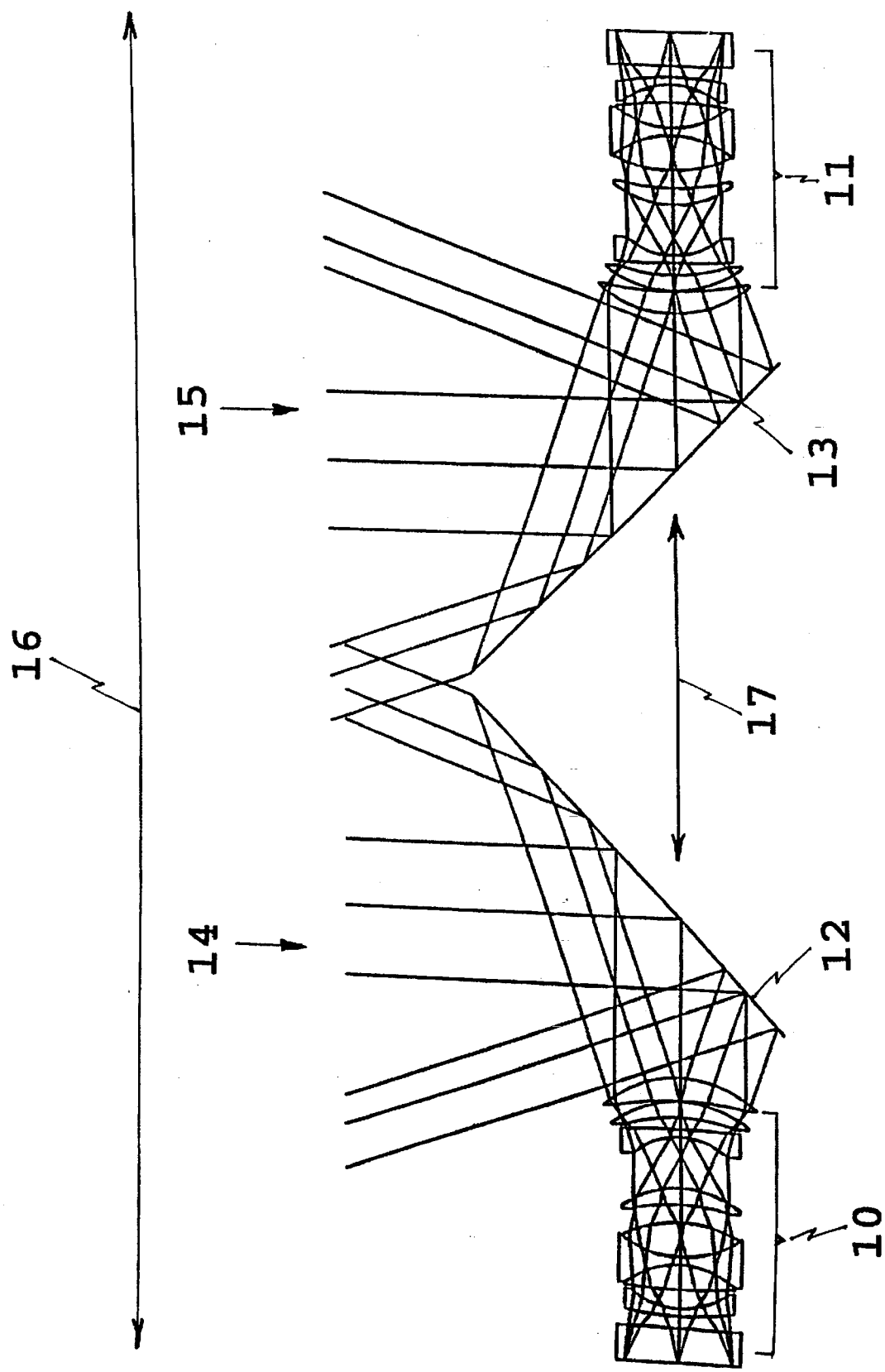
FIG. 1 is the AN/AVS-6 optics and optical raytrace utilizing fold mirrors.

Referring now to the drawings, and more particularly to FIG. 1, there is shown the present invention utilizing AN/AVS-6 intensifier assemblies 10 and 11, also with a superimposed optical raytrace. Intensifier assemblies 10 and 11 (each of which include an objective lens assembly and intensifier photocathode) are folded in close to the user's head, rather than sticking straight out in front of the eyes. This arrangement, showing both visual sides (left and right sides) does not reduce the system weight, but does move the center of gravity in closer to the user's natural head center. Right angle fold mirror which includes mirror surfaces 12 and 13 project the field of view of assemblies 10 and 11 respectively, back out in normal viewing directions 14 and 15 (straight-forward) respectively. Assemblies 10 and 11 intensify by light amplification, well known in the art, such that there is output from each assembly to respective image screens a light amplified scene of the viewing environment.

Figure 2:
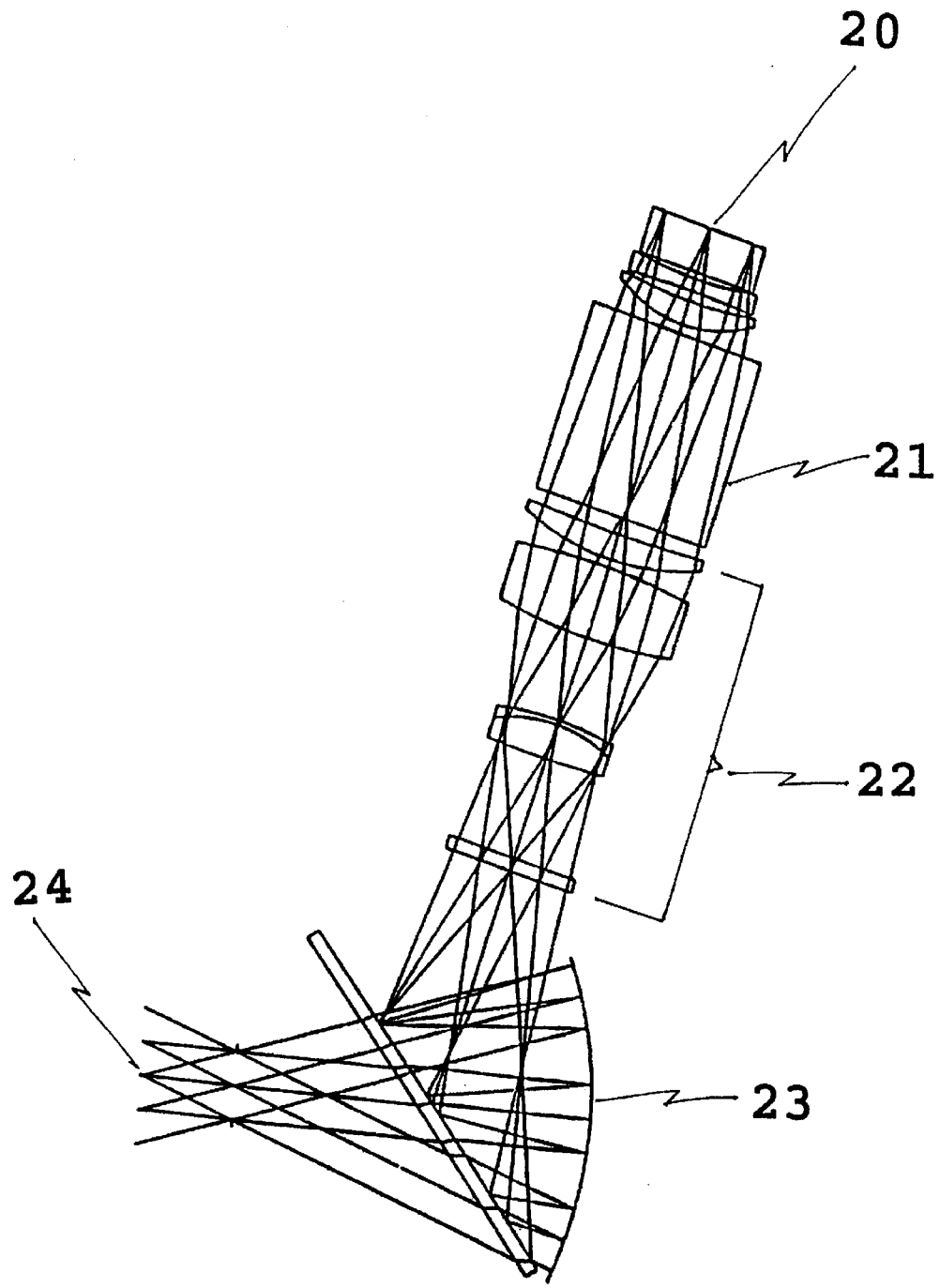
FIG. 2 is the eyepiece, relay and beamsplitter optics and optical raytrace also of the invention.

FIG. 2 is the eyepiece, relay and beamsplitter optics with superimposed optical raytrace for one visual side. It is understood that another eyepiece, relay and beamsplitter optics is present for the other visual side. Phosphor screen 20 which outputs the image intensified scene is then sent through beamsplitter 21 and then onward through relay optics 22, and finally to focused eye position 24 on eyepiece 23. A fold prism allows the restoration of the proper image orientation. Beamsplitter 21 allows the coupling of another screen to the invention. Relay optics 22 provides a focal length equal to that of the objective, thereby allowing equal focal lengths yielding a 1:1 magnification. Eyepieces 23 may be constructed to provide see-through capability by coating the partial mirrors to reflect only green phosphor light. As see-through eyepieces, eyepieces 23 would be lightweight, reflective eyepieces thus allowing the relay of the intensified image to the eye, while still allowing the user to see the normal environment and/or other superimposed image screens. The separation distance is thus greatly reduced from distance 16 which is approximately 220 mm to distance 17 which is approximately 65 mm. The normal separation for the human eyes is within the range of 50 to 70 mm, so that distance 17 will not induce hypersteropsis.

Figure 3:
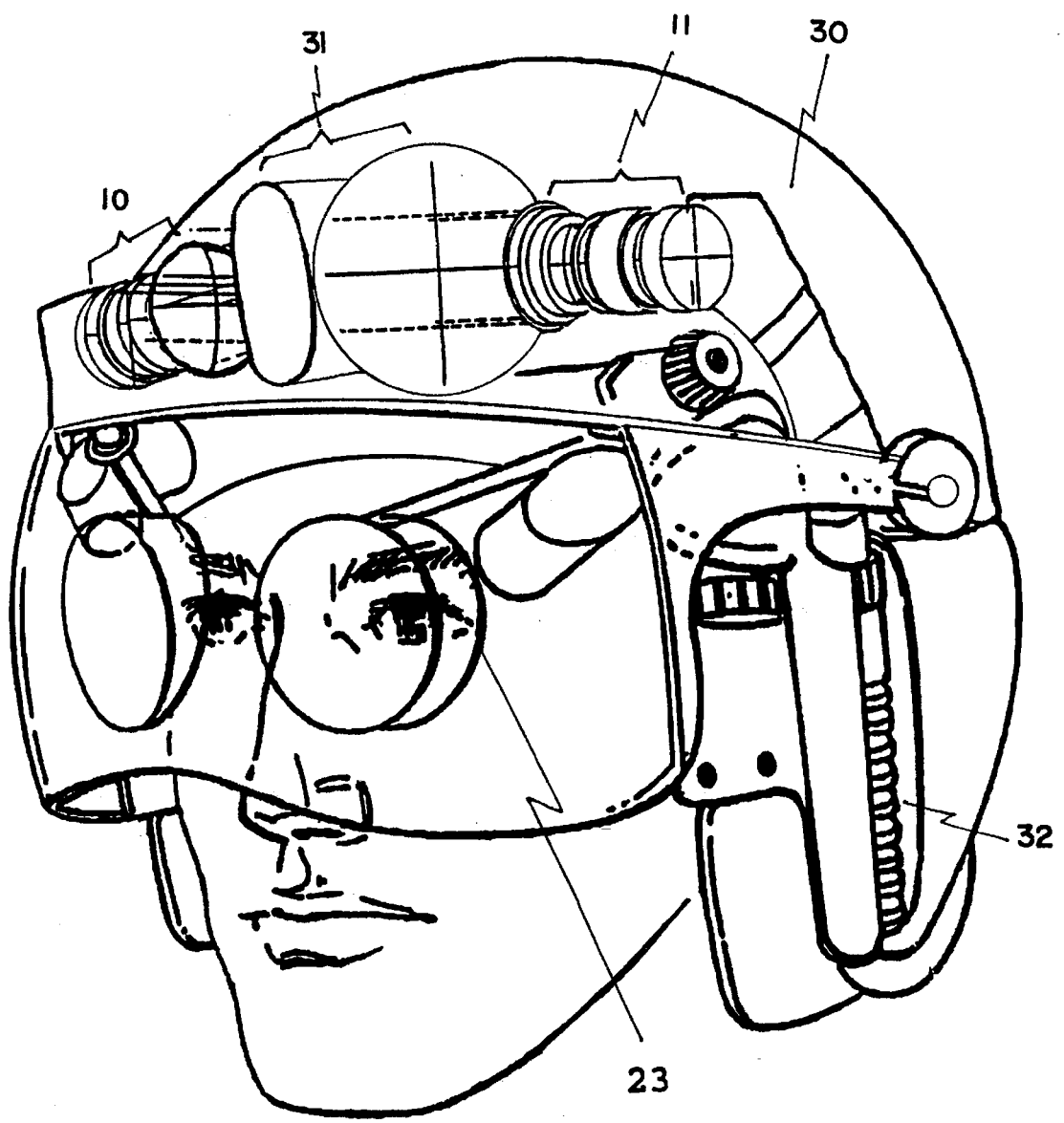
FIG. 3 is a perspective drawing of the preferred embodiment of the invention.

FIG. 3 is a perspective drawing of the preferred embodiment of FIG. 2 operated by a user. While only the right side will be described, it is understood that the left side contains essentially the same elements and functionality. Helmet 30 includes the elements described in FIGS. 1 and 2, in the arrangement of the preferred embodiment as shown in FIG. 3. Standard AN/AVS-6 intensifier assemblies 10 and 11 are mounted parallel to the user's forehead and facing in toward the nose. Although the intensifier objective optics and tubes are pushed back toward the ears as shown in FIG. 3, the lightweight mirrors reflect the sensor apertures such that the sensor separation is nearly equal to that of the human eyes (50-75 mm). Right angle fold mirror 31 is formed into a 90° wedge and reflects the field of view of each sensor forward and parallel to the normal human eye line of sight. In the present embodiment fold mirror 31 can be made of a light weight metal such as silicon carbide. Rigidly molded plastic fiber cables may be used to move the image intensifier tube back behind the ears. The last elements of the eyepiece relay has combined functions as eyepiece lenses and partially transparent direct see-through optics by coating the partial mirrors to reflect only the green phosphor light. Both the objective and eyepiece lens assemblies are designed for at least a 40° field of view, but this could easily be increased to 50° or more. The direct see-through capability of combiner eyepiece 28 does attenuate the ambient light levels somewhat, but is no worse than looking through a pair of sunglasses.

CRT 32 can be additionally mounted on the side of the head and optically coupled into the eyepiece relay optics. CRT 32 could then display remote video information including computer generated reticles, symbology, and TV video/imagery from a remote sensor. The user continues to also se the outside environment at the same time. The CRT function is coupled into the eyepiece only, and is not part of the night vision enhancement. The display function of CRT 32 could also be accomplished with a variety of flat panel display technologies, or it may be removed entirely without affecting the present invention.

The invention thus preserves the field of view and resolution of night vision goggles, but folds the components around the user's head to reduce the center of gravity moment that could otherwise cause neck injury in a crash or hard jolt situation. There is further 100% overlap of images, monocular symbology, diopter adjustment capability, and an "ANVIS +" performance, with at least 50 degree field of view. This arrangement is designed not to interfere with the system resolution and field of view.

While this invention has been described in terms of preferred embodiment consisting of the specific helmet system disclosed, those skilled in the art will recognize that the invention can be practiced with modification within the spirit and scope of the appended claims.

Having thus described my invention, what I claim as new and desire to secure by Letters Patent is as follows:

1. A helmet-mounted vision enhancement system, the system having left and right side subsystems allowing the relay of an intensified image scene to the eye, the subsystems for each side comprising:

each input subsystem including reflecting means for reflecting the field of view of the outside environment perpendicular to the normal human eye line of sight as a reflected image;

goggle subsystem including intensifier means for focus and image intensification of the reflected image, both reflecting means and intensifier means substantially parallel to the user's forehead and facing in toward the user's nose;

output subsystem for orienting an input image from the goggle subsystem which is accepted into relay optics and eyepiece optics so that a user can view an image intensified scene with a 1:1 magnification and restored normal image orientation onto an eyepiece, wherein the output subsystem further includes eyepieces optics constructed to provide see-through capability by coating partial mirrors to reflect only green phosphor light whereby eliminating hypersteropsis to the user, and further allowing relay of an intensified image scene to the eye with optional other superimposed images.

2. The helmet-mounted vision enhancement system of claim 1 wherein the output subsystem further includes a beamsplitter which allows the coupling of another input image scene to be viewed by the user.

* * * * *